SCORE SHIELD AND ANTI-IMPLOSION RING

Original Filed Nov. 3, 1967

INVENTOR
FREDERICK J. STEC

BY
Mason, Porter, Weller & Brown
ATTORNEYS

United States Patent Office

Re. 27,796
Reissued Oct. 30, 1973

27,796

SCORE SHIELD AND ANTI-IMPLOSION RING

Frederick J. Stec, Oak Lawn, Ill., assignor to Continental Can Company, Inc., New York, N.Y.

Original No. 3,447,713, dated June 3, 1969, Ser. No. 680,472, Nov. 3, 1967. Application for reissue Jan. 18, 1971, Ser. No. 107,601
Int. Cl. B65d *17/20*
U.S. Cl. 220—54 13 Claims

Matter enclosed in heavy brackets [ ] appears in the original patent but forms no part of this reissue specification; matter printed in italics indicates the additions made by reissue.

ABSTRACT OF THE DISCLOSURE

This disclosure relates to an easy opening container of the type wherein one end has substantially the entire end panel thereof removable during the opening thereof. The end panel is reinforced by a pliable ring which is positioned in underlying relation to the end panel and projecting into the removable panel portion so as to both reinforce the end panel along the score line thereof and to prevent implosion during opening when the pressure within the container is less than atmospheric.

This invention relates in general to new and useful improvements in easy opening containers, and more particularly to a container of the easy opening full opening type.

A primary feature of this invention is to provide a ring which is positioned within the container in underlying relation to the end panel of an easy opening end thereof with the ring engaging the end panel in direct underlying relation to the score line thereof so as to reinforce the end panel at the score line and prevent accidental rupture thereof along the score line.

Another feature of the invention is that the ring is formed of a pliable material and while it underlies the removable panel portion, the resistance thereof to deflection of the removable panel portion into the interior of the container is not sufficient to prevent the movement of the removable panel portion into the interior of the container during the normal opening thereof.

Another object of this invention is to provide an easy opening container with a pliable ring which directly underlies the end panel of the container end and which supports the end panel in underlying relation to the normal score line which defines a removable panel portion, the ring serving both to prevent accidental rupture of the end panel along the score line and the uncontrolled movement of the removable panel portion into the container due to the pressure within the container being less than atomspheric pressure.

A further feature of the invention is the shaping of the pliable ring so as to be seated within the container at the intersection of the end panel with the body wall and with the body wall being provided with a bead for the purpose of locating the ring.

A still further feature of the invention is that the ring may be adhesively bonded to the underside of the end panel.

With the above and other objects in view that will hereinafter appear, the nature of the invention will be more clearly understood by reference to the following detailed description, the appended claims and the several views illustrated in the accompanying drawings.

Figure 1:
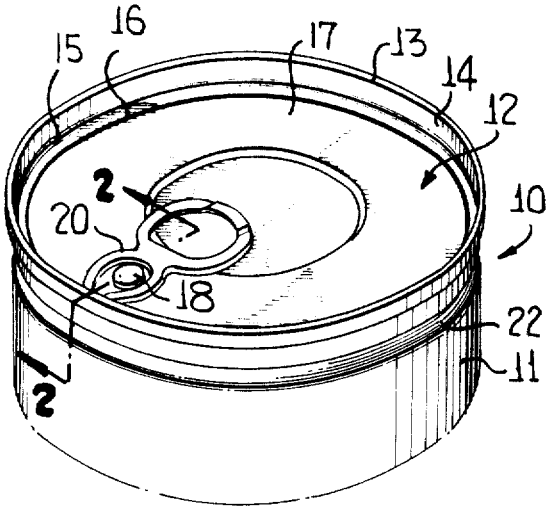
FIGURE 1 is a fragmentary top perspective view of a can formed in accordance with this invention.

Referring now to the drawing in detail, it will be seen that there is illustrated in FIGURE 1 a container or can 10. The can 10 includes a body 11 of which only the upper portion is illustrated. The lower portion of the body 11 is closed in the conventional manner. The upper end of the body 11 is closed by means of an easy opening end, which is generally referred to by the numeral 12, and which is secured to the body 11 by means of a conventional double seam 13.

The end 12 includes the usual chuck wall 14 and end panel 15. The end 12 is of a conventional full opening type and the end panel 15 thereof is provided with a peripheral score line 16 defining a removable panel portion 17 which constitutes a major portion of the end panel 15.

In order to facilitate the initial rupture of the end panel 15, the removable panel portion 17 is provided with an integral rivet 18 by means of which a pull tab 20 is secured thereto. The pull tab 20 is utilized to initially place a downwardly or inwardly directed force on the removable panel portion 17 along a starting portion of the score line 16 sufficient to effect the initial rupture of the end panel. A further movement of the pull tab 20 will result in a folding or bending of a part of the removable panel portion 17 down into the interior of the can. After this occurs, an upwardly or outwardly directed pull on the pull tab 20 will result in the complete tearing out of the removable panel portion 17.

The can 10, as described above, has several deficiencies. In the first place, because the end panel 15 is weakened by the provision of the score line 16, there is always the possibility of accidental rupture of the end panel along the score line. Secondly, when a product is vacuum packed within the can 10, due to the differential in pressure between the interior of the can and the exterior thereof, there is a danger of implosion immediately after the initial rupture of the end panel. A further disadvantage of the can is the existence of the raw edge resulting from the tearing out of the removable panel portion 17.

In accordance with this invention, the three enumerated disadvantages may be overcome by the simple provision of a pliable or resilient ring 21. The ring 21 which is generally triangular in section, is positioned within the body 11 at the intersection between the body 11 and the end panel 15. In order to facilitate the positioning of the ring 21 within the can 10, the upper portion of the body 11 is provided with a radially inwardly directed bead 22 which is spaced axially from the end panel 15. The bead 22 is so related to the dimensions of the ring 21 and to the end panel 15 so as to provide for a clamping of the ring 21 between the end panel and the bead. At the same time, it is to be noted that the ring 21 is of a dimension to project radially inwardly of the score line 16 a slight distance. At this time, it is pointed out that the bead 22 also serves to facilitate the initial positioning of the ring 21. The ring 21 may be placed within the body 11 prior to the closing thereof by the application of the end 12.

Figure 2:
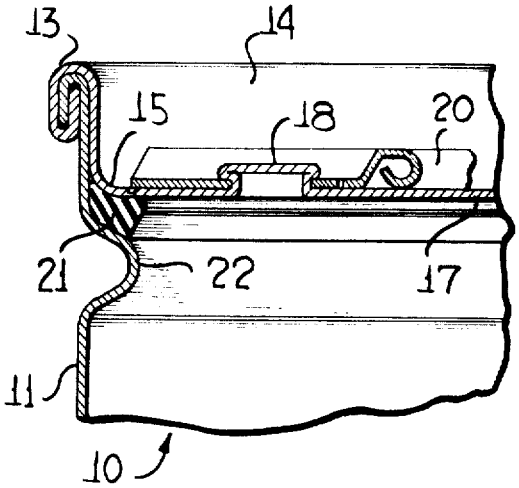
FIGURE 2 is an enlarged fragmentary vertical sectional view taken along the line 2—2 of FIGURE 1 and shows the specific details of one form of the invention.
Figure 3:
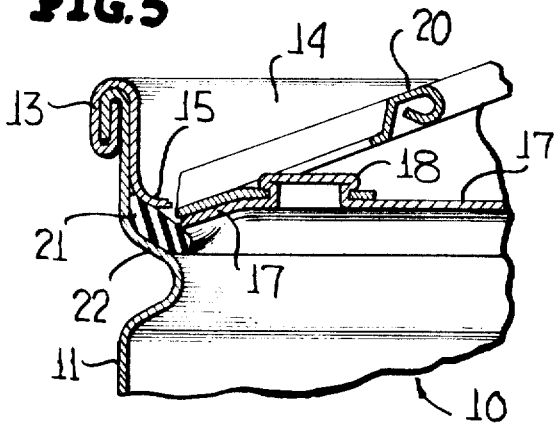
FIGURE 3 is a fragmentary sectional view similar to FIGURE 2 and shows the relationship of the pliable ring relative to the removable panel portion during the initial opening of the can.

It will be readily apparent from FIGURE 2 that the ring 21 provides a support for the end panel 15 in the vicinity of the score line 16, thereby reinforcing the end panel 15 against accidental fracture along the score line 16. On the other hand, the ring 21 is sufficiently pliable so as to deflect downwardly, as is shown in FIGURE 3, during the opening of the can 10.

It is to be understood that when the pull tab 20 is lifted to effect the initial rupture of the end panel 15 along the score line 16, the ring 21 will resist the inward movement of the removable panel portion 17. This resistance will be sufficient to prevent the undesired implosion which frequently occurs due to a differential in pressure between the atmosphere and the interior of the can 10 when the can 10 is a vacuum packed can. However, the ring 21 will be sufficiently pliable to permit the inward bending or folding of the removable panel portion 17 utilizing the pull tab 20 to provide for a sufficient initial rupture of the end panel to provide for a tearing out of the removable panel portion 17 by a later applied outwardly directed pull on the pull tab 20.

Figure 4:
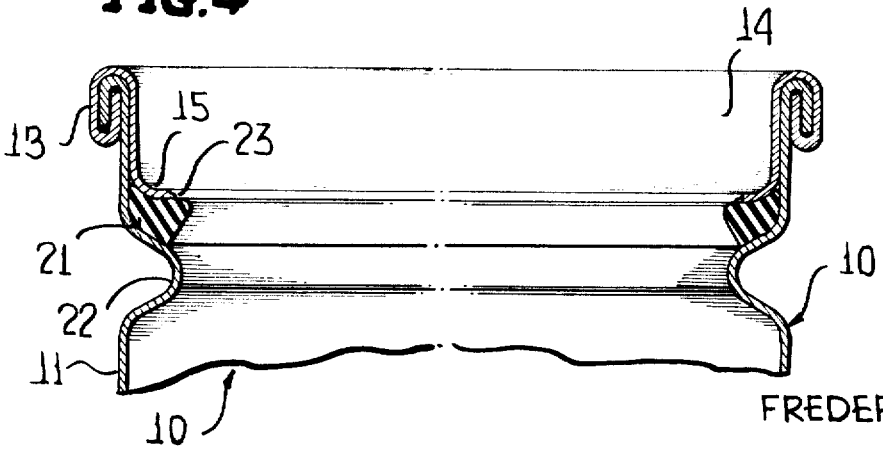
FIGURE 4 is a transverse vertical sectional view through the upper portion of the can of FIGURE 1 and shows the same with the removable panel portion removed.

Referring now to FIGURE 4, it will be seen that after the removable panel portion 17 has been torn from the end panel 15 and the can 10 has been fully opened, the ring 21 has returned to its original position. At this time it functions as a guard against accidental contact with a raw edge 23 which now exists around the inner periphery of the end panel 15. However, the ring 21 does not project radially inwardly sufficiently to unduly obstruct the removal of a product from the can 10.

It is to be understood that the ring 21 may be formed of an attractive material, such as plastic, or a rubber-type material which will in no way detract from the appearance of the can and the product packaged therein. Also, because the ring 21 remains clamped between the end panel 15 and the bead 22, there is no possibility of the bead being accidentally removed with the product. If desired, a suitable adhesive (not shown) may be applied to the ring 21 to bond the ring to the body 11 or the end panel 15 or both.

Figure 5:
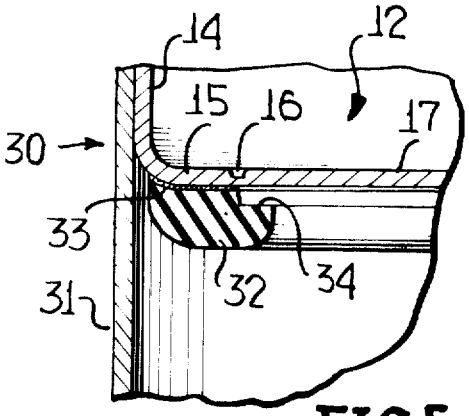
FIGURE 5 is a fragmentary vertical sectional view showing a modified form of ring construction.

In FIGURE 5 there is illustrated a slightly modified form of can construction, which can is generally referred to by the numeral 30. The can 30 includes a body 31 of a conventional type, which body has the upper end thereof closed by means of the easy opening end 12. It is to be noted that the body 31 is cylindrical as opposed to being provided with a bead, such as the bead 22. Accordingly, it is not feasible to apply a ring, such as the ring 21. Accordingly, the can 30 is provided with a modified form of ring which is identified by the numeral 32. The ring 32 is directly bonded to the underside of the end panel 15 by means of a suitable adhesive 33.

It is to be noted that the ring 32, while it does directly engage the end panel 15 beneath the score line 16 does not directly engage the removable panel portion 17. Instead, the ring 32 is notched as at 34 to permit a slight downward or inward movement of the removable panel portion 17 before it contacts the ring 32. The axial inward movement of the removable panel portion 17 will only be sufficient to permit the formation of an opening in the end panel 15 of a size to permit the venting of the can 30. Thus, the ring 32 will prevent any possibility of implosion.

It is to be understood that the ring 32 is also formed of a sufficiently pliable and resilient material so as to be deflectable under a pressure applied by the pull tab 20 so as to permit sufficient inward bending or folding of the removable panel portion 17 to release a starting portion thereof whereby further rupture of the end panel 15 and the tearing out of the removable panel portion 17 may be effected.

It is also to be noted that the ring 32, like the ring 21, remains in place after the tearing out of the removable panel portion 17 and functions as a guard for the resultant raw edge.

It will be readily apparent that the configuration of the ring may be varied from the two embodiments specifically illustrated and described herein. Accordingly, no attempt has been made to illustrate all possible embodiments. Therefore, it is to be understood that minor variations may be made in the details of the ring and its relationship to the remainder of the can without departing from the spirit and scope of the invention, as defined in the appended claims.

I claim:

1. An easy opening container including an end having an end panel, a weakening line in said end panel defining a removable panel portion, and a shield engaging said end panel along at least a starting portion of said weakening line and protecting said weakening line, said shield being secured to said container solely outwardly of said removable panel portion with a free portion of said shield overlapping said removable panel portion.

2. The container of claim 1 wherein said shield is in the path of initial opening movement of said removable panel portion, said shield being formed of resilient material and being deflectable by said removable panel portion.

3. The container of claim 1 wherein said shield extends entirely around said removable panel portion.

4. The container of claim 1 wherein said shield is bonded directly to said end panel.

5. The container of claim 1 wherein the portion of said shield overlapping said removable panel portion is spaced from said removable panel portion.

6. The container of claim 1 wherein said removable panel portion constitutes a major portion of said end panel and said shield is in the form of a ring.

7. An easy opening container including an end having an end panel, a weakening line in said end panel defining a removable panel portion, and a shield engaging said end panel along at least a starting portion of said weakening line and protecting said weakening line, there being a corner between said end panel and a body of said container, and said shield being in the form of a ring seated in said corner.

8. The container of claim 7 wherein said body has a radially inwardly directed bead adjacent said end panel, and said shield engages said head and is positioned thereby.

9. The container of claim 7 wherein said body has a radially inwardly directed bead adjacent said end panel, and said shield engages said bead and is positioned thereby, said bead being triangular in section.

*10. In a protective arrangement for a container, the combination of a tubular body member; a pair of end members secured to oppostie ends of said body member for closing said container; one of said end members including: an outer portion; a central portion detachably connected at its outer edge to an inner edge of said outer portion, a separate protective shoulder in the form of an annular bend of plastic material positioned in said body member and located axially, inwardly adjacent the outer portion of said one end member and disposed to project radially inward a slight distance beyond the inner edge of said outer portion and to underlie the outer edge of said central portion for preventing contact between a hand of a person and the raw inner edge of said outer portion which is exposed when said central portion is detached and removed therefrom.*

*11. A protective arrangement according to claim 10 wherein said bead is bonded to the inner surface of said end member outer portion.*

*12. In a protective arrangement for a container, the combination of a tubular body member; a pair of end members secured to opposite ends of said body member for closing said container; one of said end members including: an outer portion; a central portion detachably connected at its outer edge to an inner edge of said outer portion; a separate protective shoulder secured to the inner surface of said body member and disposed to project radially inward a slight distance to cover the inner edge of said outer portion, for preventing contact between a hand of a person and the raw inner edge of said outer*

*portion which is exposed when said central portion is detached and removed therefrom.*

*13. A protective arrangement according to claim 12 wherein said protective shoulder comprises an annular ring and the securement of said annular ring to the inner surface of said body member is a clamping type securement.*

References Cited

The following references, cited by the Examiner, are of record in the patented file of this patent or the original patent.

UNITED STATES PATENTS

| | | | |
|---|---|---|---|
| 3,303,958 | 2/1967 | Taylor | 220—54 |
| 3,303,962 | 2/1967 | Lake | 220—27 |
| 3,451,586 | 6/1969 | Maliszewski | 220—27 |
| 2,723,778 | 11/1955 | Rabak | 220—48 |

GEORGE T. HALL, Primary Examiner

U.S. Cl. X.R.

220—90.6